UNITED STATES PATENT OFFICE.

EDWARD J. OATMAN, OF DUNDEE, ILLINOIS, ASSIGNOR TO BURRELL & WHITMAN, OF LITTLE FALLS, NEW YORK.

MANUFACTURE OF ARTIFICIALLY-ENRICHED CHEESE FROM MILK.

SPECIFICATION forming part of Letters Patent No. 346,062, dated July 20, 1886.

Application filed March 26, 1886. Serial No. 196,686. (No specimens.)

*To all whom it may concern:*

Be it known that I, EDWARD J. OATMAN, of Dundee, in the county of Kane and State of Illinois, have invented new and useful Improvements in the Manufacture of Artificially-Enriched Cheese from Milk, of which the following is a specification.

This invention relates to the manufacture of artificially-enriched cheese from milk, skim-milk, buttermilk, or whey, and a suitable oleaginous material—such, for instance, as butter, lard, oleomargarine, or some other suitable oil or fat.

In manufacturing artificially-enriched cheese an emulsion is produced in which the oleaginous material is finely divided and intimately incorporated with the milk or its aforesaid derivatives, so that upon mixing the emulsion with the body of milk or its derivative which is to be coagulated the emulsion will blend with the same, and the oleaginous material will not separate and rise to the surface.

The object of the present invention is to produce an emulsion of superior quality in a simple and expeditious manner; and the invention consists to that end of the improvements which will be hereinafter fully set forth, and pointed out in the claims.

In practicing this invention an emulsion is first produced by placing proper quantities of the oleaginous material and milk, or its aforesaid derivatives, into a tank, barrel, or other suitable vessel, and subjecting the mass to the action of a powerful jet of steam, which is injected directly into the same. The steam-jet is delivered into the material near the bottom of the vessel, and heats the material and thoroughly agitates the same, thereby liquefying and finely dividing or disintegrating the fat or oleaginous material, and causing its particles to blend with the milk or its derivatives, so as to form an emulsion or artificial cream of uniform quality throughout.

In using butter of a low grade and skim-milk for producing the emulsion about five pounds of skim-milk are employed for every pound of butter, and the mixture is boiled until a complete emulsion is produced. One pound of salt is preferably added to the mass for every five pounds of butter or other oleaginous material which it contains. The vessel in which the emulsion is formed may be provided with a rotating or other suitable stirrer or agitator for thoroughly mixing the salt with the other ingredients. Some of the steam condenses in the liquid and increases its specific gravity in connection with the salt which is dissolved, whereby the emulsion is rendered specifically heavier and better adapted to be thoroughly incorporated with the skim-milk or other liquid to be coagulated. This emulsion is added to the skim-milk to be coagulated in the proportion of about one and one-half pound of butter or other oleaginous material to one hundred pounds of skim-milk. The mass of skim-milk is placed in the cheese-vat and warmed to a temperature of about 76° Fahrenheit. The coloring-matter, if used, is mixed with the skim-milk, and a sufficient quantity of rennet is made ready to "set" the milk in not more than thirty minutes. The emulsion is now added, boiling hot, to the mass of skim-milk, and thoroughly incorporated with the same as quickly as possible. The rennet is then added, and the mass is stirred, at first energetically and then lightly, until the rennet begins to act. The curds are then treated in the usual manner, and the whey is drawn off as soon as practicable. If the butter is old in flavor, a small quantity of sal-soda is added to the emulsion. By this improved method an emulsion of superior quality is produced in a very simple and expeditious manner. The emulsion is easily incorporated with and retained in the milk, skim-milk, or other liquid from which the cheese is manufactured, and is consequently completely incorporated with the curds, producing a rich cheese of uniform quality at comparatively small cost.

I claim as my invention—

1. The herein-described method of producing an emulsion from milk or its derivatives and a suitable oleaginous material, which consists in thoroughly dividing and commingling the ingredients by injecting a steam-jet into the mixture, substantially as set forth.

2. The herein-described method of producing a heavy emulsion from milk or its derivatives and a suitable oleaginous material, which consists in adding salt to the mixture and injecting a steam-jet into the same, whereby all of the ingredients are thoroughly liquefied and blended with each other, substantially as set forth.

3. The herein-described method of manufacturing artificially-enriched cheese, which consists in forming an emulsion from milk or its derivatives and a suitable oleaginous material by injecting a steam-jet into the mixture, then adding the emulsion to the milk or its derivative to be coagulated, then adding the rennet, and then further treating the curd to produce the cheese, substantially as set forth.

Witness my hand this 22d day of March, 1886.

EDWARD J. OATMAN.

Witnesses:
T. H. MIDDLETON,
C. VAN VECHTEN.